July 12, 1966  G. LEMESLE ETAL  3,260,384
NUCLEAR REACTOR REFUELLING FACILITY
Filed Nov. 26, 1963  5 Sheets-Sheet 1

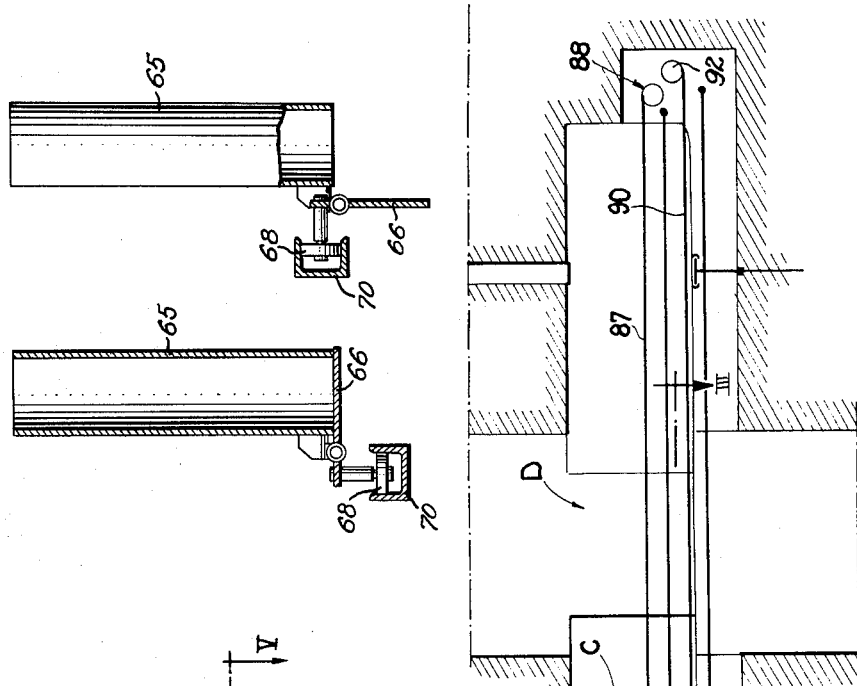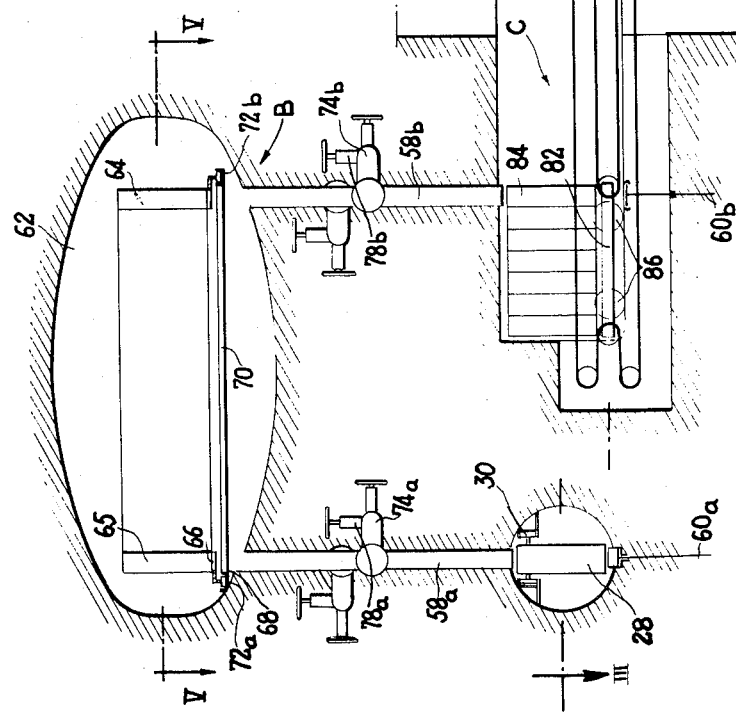

United States Patent Office 3,260,384
Patented July 12, 1966

3,260,384
NUCLEAR REACTOR REFUELLING FACILITY
Georges Lemesle and Roger Martin, Paris, Pierre Rouge, Gif-sur-Yvette, and Jean Vivien, Versailles, France, assignors to Commissariat à l'Energie Atomique, Paris, France
Filed Nov. 26, 1963, Ser. No. 326,154
Claims priority, application France, Dec. 11, 1962, 918,262
8 Claims. (Cl. 214—18)

This invention relates to refuelling facilities for the charge and discharge of fuel elements in nuclear reactors of the gas-cooled type comprising a servicing chamber and more particularly a system for the insertion and withdrawal of fuel elements into and out of said servicing chamber.

The term "servicing chamber" is understood to refer to the enclosed space which is provided in the reactor containment building either above or below the vessel containing the core and which is separated from this latter by a biological shield for attenuating radiation. There can be disposed within the servicing chamber different equipment units and in particular a fuel element handling unit which serves to re-charge the channels in which said fuel elements are disposed.

The presence of a servicing chamber endows nuclear reactors with a certain number of advantages. In the first place, such a servicing chamber facilitates the transfer of fuel elements between the fuel channels and the handling unit (a passageway being provided for this purpose through the biological shield in alignment with each fuel channel). In the second place, the period of time during which irradiated fuel elements can thus be stored within the containment building allows the activity of the fuel elements to decay to such an extent that any cooling operation during the removal of fuel elements to the storage pond is accordingly dispensed with. The use of conventional mechanisms within the servicing chamber is also permitted, provided that the temperature of said chamber is maintained at a sufficiently low value.

The present invention is directed to the design of a system for insertion and withdrawal at high speed so as to permit of rapid transfer of fuel elements between a magazine which is located within the servicing chamber and another magazine which is located outside said servicing chamber.

To this end, the invention proposes a refuelling facility for the charge and discharge of fuel elements in a nuclear reactor comprising a servicing chamber and a system for the insertion and withdrawal of fuel elements into and out of said servicing chamber, characterized in that said facility comprises:

A lock-chamber occupied by a conveyor which is provided with fuel element compartments and which is movable so as to displace the fuel element compartments between a position in which said compartments are located opposite an inlet providing admission to the lock-chamber from the servicing chamber and a position in which said compartments are located opposite an outlet from said lock-chamber to the exterior, said inlet and said outlet being respectively provided with isolating valves, First fuel-element storage magazines which are transferred between a location opposite the inlet of the lock-chamber and storage locations, Second fuel-element magazines which are disposed in a location opposite the outlet of the lock-chamber, And means for the exchange of fuel elements between the compartments of the conveyor and the compartments of the magazines.

In a preferred form of embodiment, the fuel-element exchange means make it possible to convey simultaneously between the conveyor and the transfer means a number of fuel elements which is equal to that received by each of the first fuel element magazines.

A better understanding of the invention will be had from a perusal of the following description relating to one form of embodiment which is given solely by way of non-limitative example, reference being made therein to the accompanying drawings, wherein:

FIG. 4 is a sectional view of the device taken along the line IV—IV of FIG. 3.

FIG. 4a is an enlarged sectional view of a magazine for the conveyor.

FIG. 4b is an enlarged sectional view of a magazine for the conveyor with the bottom opened.

Figure 1A:
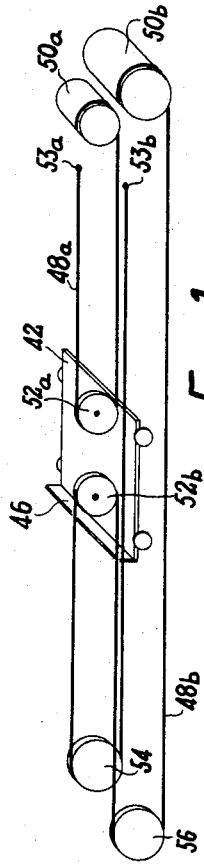
FIG. 1a is a diagram representing the kinematics of operation of the equipment units which are shown in FIG. 1.

The insertion and withdrawal device which is illustrated in the drawings is intended for a nuclear reactor of the solid moderator and gas-cooled type which is equipped with a handling unit of the type described in the co-pending United States patent application Serial No. 312,784 filed on September 30, 1963, now Patent No. 3,205,143, by the present applicant for "Handling Unit for Nuclear Reactor Refueling System." However, the introduction and withdrawal device in accordance with this invention can be employed within the scope of any refuelling facility which comprises a handling system within a servicing chamber, although evidently at the price of detail modifications.

The handling unit which is described in patent application Serial No. 312,784, now patent No. 3,205,143, comprises a horizontal beam which can be oriented about the vertical axis of the reactor so as to be brought either in oppositely facing relation to any one of a series of magazine storage stations arranged at the periphery of the servicing chamber or in oppositely facing relation to one of the transfer stations to which or from which said magazines are either brought or removed by the insertion and withdrawal device. Reference can also usefully be made to the above-mentioned patent application for a more comprehensive description of the device, so that only those elements which are essential to the description will again be referred-to hereinafter. FIGURES 1 and 2 show the terminal portion of the rotary beam 6 which is disposed within the servicing chamber 8 as delimited by the outer containment shell 9 of the reactor and a slab 10 which separates said servicing chamber from the pressure vessel containing the reactor core (not shown).

The beam 6 is provided with three pairs of parallel rails or tracks 12, 14 and 16. A trolley is designed to travel along the top track 12 and consists of a frame which is fitted with guide rollers 20 and to which is attached a vertical guide 22, a fuel element handling grab 24 being slidably disposed within said guide. A drive system is provided for the displacement of said trolley along the track 12.

A driving trolley 26 is intended to run along the central track for the purpose of conveying the fuel element magazines 28 between the storage stations or insertion and withdrawal stations which are disposed at the periphery of the refuelling chamber and any predetermined point of the beam. The said trolley 26 is also provided with a drive system. A full description of the drive systems can also be found in patent application No. 312,784, now patent No. 3,205,143, which has already been mentioned.

The fuel element magazines 28 or storage-transfer magazines are adapted to travel on the bottom rails 16 and are accordingly fitted with rollers 30 for this purpose. Said storage-transfer magazines are provided with a row of open-topped sockets or compartments such as the compartment 32 which are designed to accommodate fuel elements and which are placed in such manner that the grab 24 is capable of moving into position opposite each compartment without entailing any need to provide for a movement of the magazines transversely with respect to the beam. Open-bottomed end-compartments or through-passages can be employed as guides so as to permit of the downward movement of the grab within the fuel channels.

The bottom of each fuel magazine socket or compartment is pierced with an opening providing a passageway for a push-rod, the function of which will be brought out hereinafter. Each storage station (as shown in FIG. 2) is constituted by two parallel rails 34 having the same track-width as the rails 16 and set at a slight gradient so as to prevent any untimely release of the magazines. The initial coupling and propulsion of the magazines are carried out by the engagement of dogs 36 of the trolley 26 in guides 38 which are carried by the magazines 28. As the beam carries out a movement of rotation, the internal dog 36 sweeps the inner guide grooves 38 of all the storage-transfer magazines which are placed on their respective storage stations. In order to bring a storage-transfer magazine on to the beam, it is thus merely necessary to cause the rails 16 and 34 to coincide in a suitable manner and to displace the trolley 26 towards the axis of rotation of the beam.

The insertion and withdrawal station or stations (as shown in FIG. 1) are constituted by the terminal portion of rails 40 having the same track-width as the rails 16 and 34.

The parts of the refuelling system which have been described so far are similar to those which have been described as a second form of embodiment in patent application No. 312,784, now Patent No. 3,205,143. The system in accordance with the present invention consists of one or a number of assemblies which are either partially or totally independent and one of which will now be described below. Each assembly can be split up at will, firstly into a system A for the transfer of fuel element magazines between an insertion and withdrawal station and a lock-chamber exchange station, secondly into said lock-chamber B itself together with its associated elements, and lastly into a system C for the transfer of fuel element magazines between a lock-chamber exchange station and an elevator for the removal of irradiation fuel elements and supply of clean fuel elements. These three systems will be successively described below.

Figure 1:
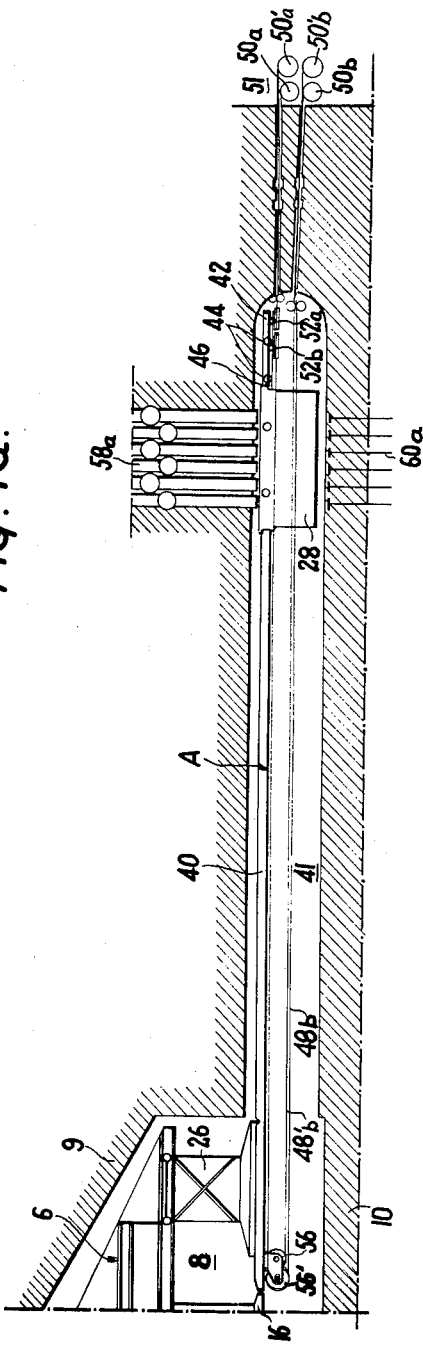
FIG. 1 is a view of the insertion and withdrawal device taken in cross-section along the line I—I of FIG. 3 and showing one portion of said device which is connected to the reactor servicing chamber.
Figure 2:
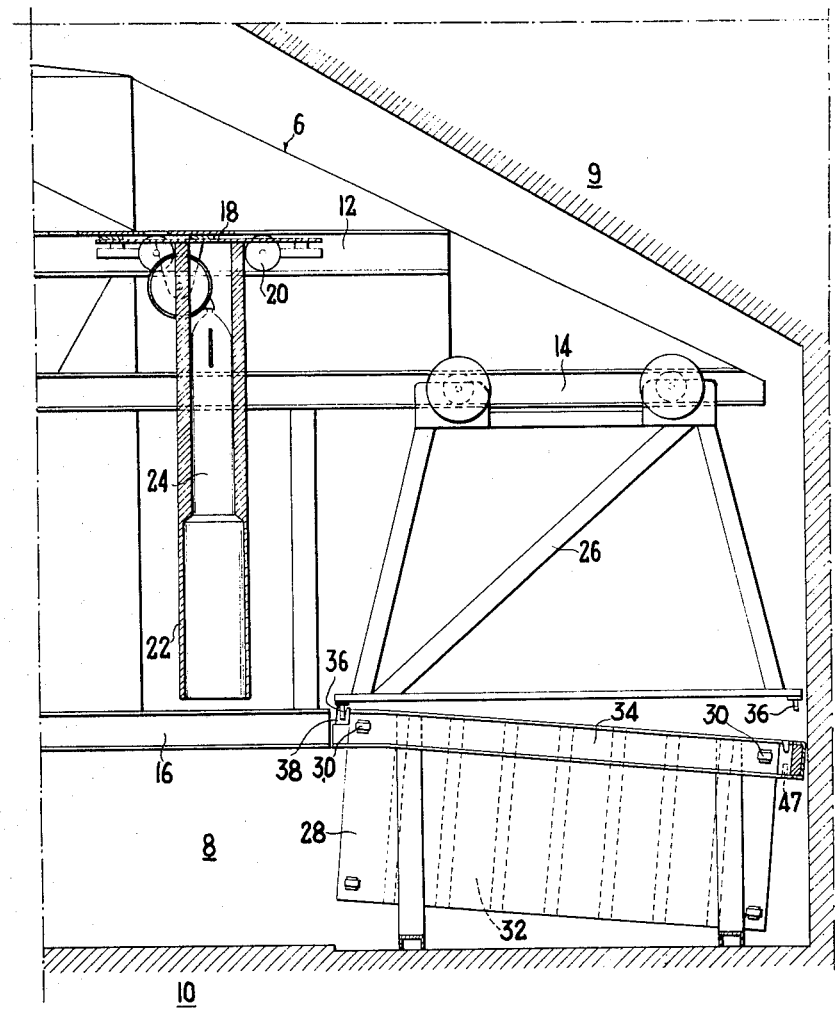
FIG. 2 is a detail view on a larger scale showing a portion of the handling and storage system which is associated with the device, taken in cross-section on a plane passing through the axis of the reactor.
Figure 3:
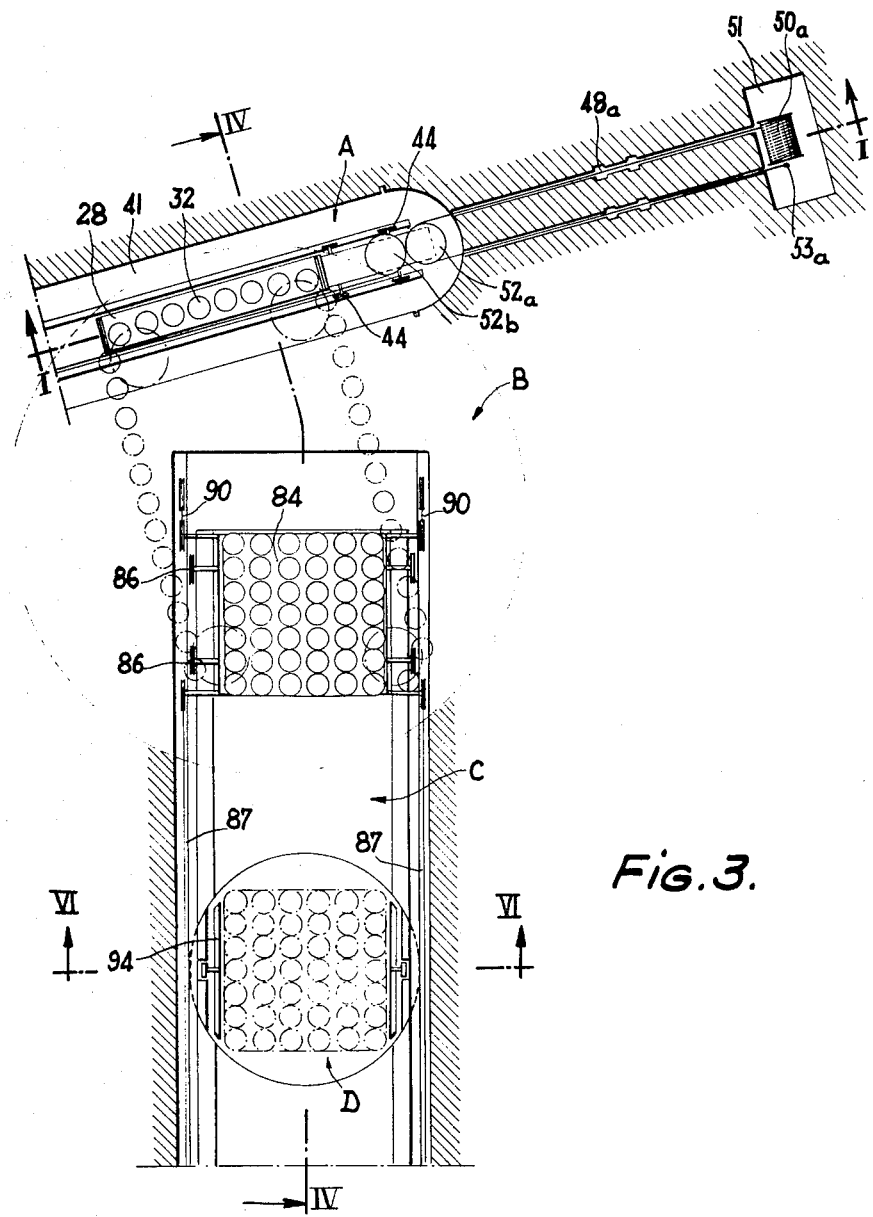
FIG. 3 is a sectional view of the device taken along the line III—III of FIG. 4.

The transfer system A (as shown in FIGS. 1, 1a and 3) is disposed within a tunnel 41 which opens into the servicing chamber and into which extend the parallel rails 40, said rails being disposed radially with respect to the axis of the reactor. This system essentially consists of a driving trolley 42 and associated drive system. The trolley 42 is made up of a frame provided with guide rollers 44 and traction pulleys. The inner end of the trolley in the radial direction is provided with a claw 46 which is inserted in a corresponding groove 47 of the storage-transfer magazine 28 (as shown in FIG. 2) when this latter is conveyed along the rails 40 and by means of which said magazine may be moved.

In order to provide a greater measure of safety, the control system for driving the trolley consists of two identical movement-transmission systems, only one of which is represented in FIG. 1a. There are shown in FIG. 1 elements which form part of both systems, corresponding components being accordingly designated by the same reference numeral to which is assigned the prime index.

Each of the movement-transmission systems mentioned above comprises two cables (one for each direction of translational motion of the trolley) which are moved by separate motor means. In FIG. 1a, the displacement of the trolley from the axis of the reactor is carried out by means of a first cable 48a which is moved by means of a winch 50a disposed outside the tunnel 41. The said winch is placed in a separate pressurized housing 51 and the cable traverses the wall between tunnel and housing through a device which provides a fluid-tight seal as and when the cable is replaced.

The end of the cable 48a which is not connected to the winch is secured within the housing 51 at a fixed point 53a (as shown in FIG. 1a). From this point, the cable extends horizontally up to a traction pulley 52a carried by the trolley frame and follows a return path in the opposite direction back to the winch 50a.

The displacement of the trolley towards the axis of the reactor is effected by means of a second cable 48b which is moved in the same manner as the cable 48a but which is provided with two additional guide pulleys 54 and 56 for counter-motion through 180° and which are carried on the ends of the rails 40. The cable 48b is moved by a winch 50b whilst the other end of said cable is attached to a fixed point 53b.

The solution hereinbefore described which consists in disposing the ends of the cables within a housing which is separate from the tunnel has an advantage over the solutions of the prior art in that it permits the replacement of the cable by means of a simple process without entailing depressurization of the servicing chamber.

It will be apparent that the winches 50a and 50b are coupled by means which have not been shown in the drawings with a view to ensuring that one winch takes up its cable while the other winch lets off its cable.

The trolley 42 thus makes it possible for the storage-transfer magazines 28 to be moved between one position of engagement with the trolley 26 (at the inner extremity of the rails 40) and a position of exchange with the lock-chamber, a storage-transfer magazine being shown in said exchange position in FIG. 1.

In this position, each of the fuel element compartments of the magazine 28 is in oppositely facing relation on the one hand to a lock-chamber inlet duct such as the duct 58a and on the other hand to a push-rod such as 60a for the transfer of fuel elements.

Figure 5:
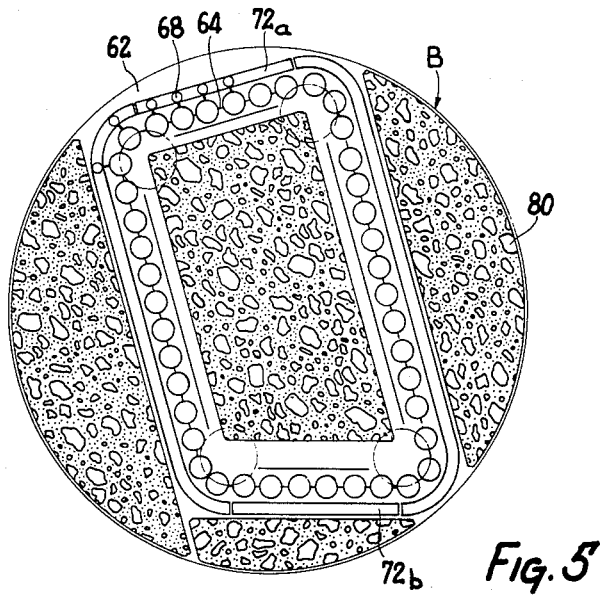
FIG. 5 is a sectional view of the device taken along the line V—V of FIG. 4.

The lock-chamber B and associated elements are represented in FIGS. 4 and 5. The lock-chamber proper consists of a chamber 62 in which is disposed a band conveyor 64 in which are formed a series of compartments such as the compartment 65 which are designed to receive the fuel element assemblies. Each compartment is closed at the bottom by a swingable flap 66 in which is pierced a hole providing a passageway for the push-rod. A roller 68 which is fitted on the flap 66 is designed to run in a guide rail 70 which, in the rest position thereof, maintains the flap in the closed position. However, the said rail 70 has two movable segments 72a and 72b (as shown in FIG. 5), the actuation of which produces the opening of the flaps which are in oppositely facing relation either to the inlet ducts 58a or to the outlet ducts 58b (as shown in FIG. 4). A control device of this type is of conventional design and does not therefore need to be described in detail.

The band conveyor 64 is capable of travelling within the chamber 62 in such manner that the compartments 65 with which said conveyor is provided are brought successively opposite the inlet ducts 58a and outlet ducts 58b. The said inlet and outlet ducts are fitted with isolating valves 74a and 74b which make it possible to connect the lock-chamber either to the reactor pressure or to atmospheric pressure for the maintenance of said valves which can be separated from the corresponding duct by shut-off valves 78a and 78b.

In order to reduce the volume of the gas-filled chamber 62, the clearances provided by the band conveyor 64 can advantageously be packed with full blocks 80 of concrete, for example, as shown in FIG. 5.

The system C for the transfer of fuel element magazines or external-transfer magazines between a lock-chamber exchange station and an elevator D for supply of clean fuel elements and removal of spent elements is represented in FIGS. 3 and 4. This system consists of a trolley 82 which is designed to receive a fuel element magazine 84.

In order to ensure that the fuel element magazine 84 is accurately positioned on the trolley 82, this latter can advantageously be provided with a central frusto-pyramidal recess in which is engaged a complementary frusto-pyramidal end forming an extension of said magazine 84.

The trolley 82 is consituted by a frame fitted with rollers 86 running in rails which have not been shown for the sake of clarity of the drawings. The said trolley is fitted with a drive system which is similar to that of the trolley 42 and which it will not be necessary to describe in detail; it should merely be noted that the displacements of the trolley 82 are carried out in one direction by one or a number of first cables 87, one end or each end of which is attached to a winch 88 whilst the opposite extremity or each opposite extremity is attached to a fixed point and wound over one or a number of traction pulleys carried by the trolley, and in the other direction by one or a number of second cables 90 which are moved by a winch 92 and provided with guide pulleys for a pulling angle of 180°.

A single system C and a single elevator D are provided and are common to both units with which the reactor is equipped. Accordingly, the trolley 82 must be capable of moving either to a first transfer station in which it is shown in FIG. 4 or to a second station which is symmetrical with respect to the axis of the elevator D or finally into the elevator and the control device must be disposed on either side of the elevator cage so as to release this latter.

The systems other than C and D have been duplicated for safety reasons, only one system working normally and the other system being employed in the case of breakdown of the first system. On the contrary, the systems C and D are single since they can be repaired immediately.

The system C is provided for each lock-chamber with one set of push-rods 60b which are similar to the push-rods 60a and which are controlled by means which have not been illustrated in the drawings, and the purpose of which will be described below. It will be apparent that the push-rods 60b are disposed opposite the outlet ducts 58b of the lock-chamber.

The driving mechanism of the trolley 82 is designed to permit of accurate immovable positioning of any one of the rows of holder tubes of the external-transfer magazine 84 in oppositely facing relation to the outlet ducts 58b of the lock-chamber. By way of example, the lock-chamber can comprise six inlet ducts and six outlet ducts, each storage-transfer magazine 28 being accordingly provided with six receiving compartments whereas the external-transfer magazine is provided with six rows of receiving tubes. In the case which is described, the external-transfer magazine is designed for the purpose of changing the fuel elements of three reactor channels. The conveyor comprises a number of compartments or sockets which is equal to the sum of the number of tubes of the external-transfer magazine 84 and of the number of compartments of the storage-transfer magazine 28.

The operation of the device during a refuelling operation will now be described with reference to all the figures of the accompanying drawings.

Figure 6:
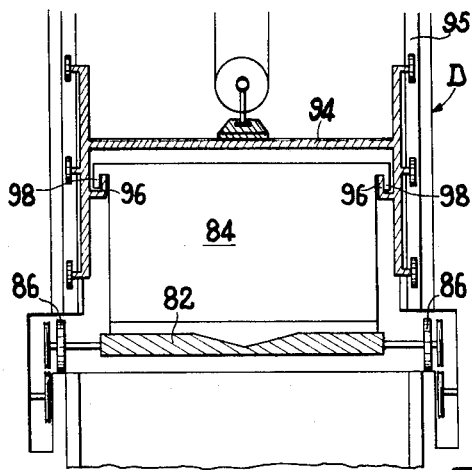
FIG. 6 is an enlarged detail of the elevator seen in FIGS. 3 and 4.

The elevator D (as shown in FIG. 6) consists of an open-bottomed skip 94 which runs on vertical rails 95 and which is driven by a system which has not been illustrated in the drawings. The skip is provided with two lateral claws 96 in which are engaged flanges 98 of the external-transfer magazine 84 which are provided for this purpose when the trolley 82 is brought into the elevator cage.

The band conveyor 64 is assumed to be loaded with clean fuel elements which occupy all the compartments except for six compartments which are intended to receive the first six irradiated elements withdrawn from the reactor and which are accordingly positioned opposite the inlet conduits. The external-transfer magazine 84 is full of clean fuel elements and occupies the position in which it is shown in FIG. 4 and in full lines in FIG. 3.

One storage-transfer magazine 28 which is packed with irradiated elements is brought along the rails 40 from a storage station by means of the handling unit. The said magazine is taken in this position by the trolley 42 and is drawn by this latter up to the transfer station in which it is immovably arrested in the position which is illustrated in FIGS. 3 and 4.

The compartment of the lock-chamber is connected to the reactor pressure and the valves 74a are opened (the valves 74b remaining closed). The rails 72a is actuated so as to open the flaps 66 of the six empty compartments of the conveyor, there being then actuated the push-rods 60a which pass through the bottom portions of the compartments of the magazine 28 and which lift the fuel elements into the six empty compartments of the conveyor. After the fuel elements have been placed in position, the rail 72a is brought back into its rest position so as to close off the flaps 66 and the push-rods return downwards; the six fuel elements which are inserted in the conveyor remain applied against the bottom of their recesses.

The conveyor is then moved forward by a distance such that six compartments filled with clean elements come opposite the inlet ducts 58a. The push-rods 60a are lifted, pass through the flaps and hold the corresponding fuel elements in position. The rail 72a is once again actuated and opens the flaps; the push-rods can be moved down again, followed by the new fuel elements which are inserted in the compartments of the storage-transfer magazine 28. In a sequence of steps reverse from those described above, the storage-transfer magazine is then brought on to a storage station and replaced by another. The sequence of operations which has just been described is repeated until all the compartments of the conveyor except six of these latter are filled with irradiated fuel elements. The second phase of the operation, that is to say the transfer of said elements from the lock-chamber into the external-transfer magazine 84 and the replacement of said elements by new elements is then carried out.

The lock-chamber is first of all isolated from the reactor by closure of the valves 74a, then connected to atmospheric pressure and to the elevator by means of the valves 74b; the six empty compartments of the conveyor are brought opposite the push-rods 60b, whereupon the rail 72b is actuated.

The push-rods 60b are actuated, are lifted as they pass through the recessed bottom portions of the tubes of the magazine 84 and thrust the new elements contained in the tubes of magazine 84 into the compartments of the conveyor. The rail 72b is brought back to the normal position, thereby immobilizing the fuel elements, and the push-rods are again lowered.

On completion of this operation, the conveyor is moved forward by six compartments. The push-rods are again actuated and then slightly lift the irradiated elements which are contained in the six compartments of the conveyor 64. The rail 72b is tilted so as to release said elements and the push-rods 60b lowered again followed by the fuel elements contained in the compartments. The six tubes of the first row of the external-transfer magazine are thus filled. The sequence of operations is repeated after the trolley 82 has moved forward as many times as it is necessary to transfer the contents of the conveyor into the magazine and the contents of this latter into said conveyor.

When filled with irradiated elements, the magazine 84 is brought onto the skip 94 of the elevator D. This operation is carried out as follows: the skip 94 being at a suitable level, the magazine 84 is brought by means of the trolley 82 from the position which is shown in full lines to that which is shown in chain-dotted lines in FIG. 3. In this position, the claws 96 of the skip are engaged beneath the flanges 98 of the magazine. The skip is lifted to a slight extent so as to disengage the magazine 84 from the trolley 82 and this latter is moved away from the elevator cage so as to permit freedom of movement of the skip. The skip is then lowered with the magazine which is deposited on a truck for subsequent discharge of the spent fuel elements to a deactivation pond.

The above-mentioned truck brings back another external-transfer magazine which is filled with new fuel elements and which is then taken over in a process which is carried out in the reverse sequence to that previously described so as to be brought into the position which the previous magazine had occupied.

It should be noted that all the operations which have just been described entail movements of fuel elements which are effected solely as a result of lowering in a vertical and downward direction under gravity or as a result of a lifting movement which is also carried out in a vertical direction. This solution has the advantage of great ease and reliability of handling. However, provision can also be made for a discharge operation wherein the storage-transfer magazines or external-transfer magazines are swung to the horizontal position for the purpose of transferring fuel elements. The penalty imposed by this solution, however, is that it entails the need for push-rods or in a more general sense driving members which produce action in both directions of movement. The horizontal discharge solution thus presents increased mechanical complexity which is counterbalanced by smaller dimensional requirements in the vertical direction only in a minority of cases.

Finally, it will be wholly apparent that the invention is not limited to the form of embodiment which has been given by way of example and it must be understood that the scope of the present invention extends to all alternative forms of the system and those components thereof which remain within the definition of equivalent mechanical means.

What we claim is:
1. Device for the introduction of fuel elements within a nuclear reactor servicing chamber within the pressure vessel and biological shield of the reactor and for the withdrawal of the elements from the chamber, said device comprising a servicing chamber, a lock chamber, an inlet between said servicing chamber and said lock chamber, an outlet from said lock chamber to the exterior, a conveyor in said lock chamber, fuel element compartments in said conveyor, said conveyor being movable so as to displace said fuel element compartments between a position in which said compartments are located opposite said inlet providing admission to said lock chamber from said servicing chamber and a position in which said compartments are located opposite said outlet, isolating valves for said inlet and said outlet, storage locations in said servicing chamber for the fuel elements, first fuel elements storage magazines for transfer between a location opposite said inlet of said lock chamber and said storage locations, second fuel element magazines for location opposite said outlet of said lock chamber, fuel elements compartments for said magazines and means for exchange of fuel elements between said compartments of said conveyor and said compartments of said magazines.

2. Device as described in claim 1, said inlet and said outlet of said lock chamber comprising a series of conduits, obturation means for said conduits, said conveyor being immovably arrested in a series of positions whereby said fuel element compartments of said conveyor are in alignment with said conduits.

3. Device as described in claim 2, said exchange means comprising push rods passing through said inlet and said outlet conduits entering said compartments of said magazines and said compartments of said conveyor to contact the fuel elements inside said compartments.

4. Device as described in claim 3, said compartments, said conduits and said push rods being disposed vertically, the corresponding ones of said compartments of said conveyor and of said magazines being vertically disposed above each other when the fuel elements are transferred.

5. Device as described in claim 4, the number of said conduits and of said push rods being equal to the number of said fuel element compartments of said first magazines.

6. Device as described in claim 5, said conveyor being higher than said magazines and said compartments of said conveyor having openable bases and means for opening said bases when said bases are in alignment with said conduits.

7. Nuclear reactor refuelling facility comprising a device as described in claim 6 including means for transferring said first magazines between said storage locations and the location opposite said lock chamber inlet.

8. Nuclear reactor refuelling facility as described in claim 7 including means for transferring said second magazines between the exterior and a series of locations in each of which a different series of said compartments of said second magazines is opposite said lock chamber outlet.

References Cited by the Examiner
UNITED STATES PATENTS

| | | | |
|---|---|---|---|
| 2,338,258 | 1/1944 | Ray | 198—43 |
| 2,648,419 | 8/1953 | Detrez | 198—24 |

GERALD M. FORLENZA, *Primary Examiner.*

HUGO O. SCHULZ, *Examiner.*

R. G. SHERIDAN, *Assistant Examiner.*